United States Patent
Lunev

(10) Patent No.: US 12,013,837 B1
(45) Date of Patent: Jun. 18, 2024

(54) SYSTEM AND METHOD FOR CHECKING CONTAINER BLOCK DEVICE METADATA AND FILE SYSTEM METADATA

(71) Applicant: Virtuozzo International GmbH, Schaffhausen (CH)

(72) Inventor: Denis Lunev, Moscow (RU)

(73) Assignee: Virtuozzo International GmbH, Schaffhausen (CH)

( * ) Notice: Subject to any disclaimer, the term of this patent is extended or adjusted under 35 U.S.C. 154(b) by 107 days.

(21) Appl. No.: 17/539,874

(22) Filed: Dec. 1, 2021

(51) Int. Cl.
*G06F 16/23* (2019.01)
*G06F 9/455* (2018.01)

(52) U.S. Cl.
CPC ...... *G06F 16/2365* (2019.01); *G06F 9/45558* (2013.01); *G06F 16/2372* (2019.01); *G06F 2009/45579* (2013.01); *G06F 16/2386* (2019.01)

(58) Field of Classification Search
CPC ...... G06F 9/45558; G06F 2009/45562–45591; G06F 16/2365–2386
See application file for complete search history.

(56) References Cited

U.S. PATENT DOCUMENTS

| | | | | |
|---|---|---|---|---|
| 9,823,977 | B2 * | 11/2017 | Dornemann | G06F 11/1464 |
| 11,386,070 | B2 * | 7/2022 | Natanzon | G06F 16/275 |
| 2016/0359955 | A1 * | 12/2016 | Gill | H04L 67/10 |

* cited by examiner

*Primary Examiner* — Robert W Beausoliel, Jr.
*Assistant Examiner* — Nirav K Khakhar
(74) *Attorney, Agent, or Firm* — ArentFox Schiff LLP; Michael Fainberg

(57) ABSTRACT

Disclosed herein are systems and methods for detecting container block device and file system inconsistencies. In one aspect, an exemplary method comprises, on a computing device, by a processor of the computing device, when an inconsistency is detected on the block device metadata retrieved without stopping I/O operations to the block device for the container, temporarily stopping I/O operations to the block device for the container, retrieving block device metadata while the I/O operations to the block device for the container are temporarily stopped, allowing the I/O operations to the block device for the container to resume, performing consistency check on the block device metadata; when no inconsistency is detected performing consistency check on the file system of the container based on a snapshot of the block device having a state of the file system therein.

20 Claims, 7 Drawing Sheets

SYSTEM AND METHOD FOR CHECKING CONTAINER BLOCK DEVICE METADATA AND FILE SYSTEM METADATA

TECHNICAL FIELD

The present disclosure is generally related to the field of fault tolerance in a virtual environment, more specifically to systems and methods for detecting the virtual environment block device and file system corruption without terminating processes running in the virtual environment.

BACKGROUND

Data and metadata in a disk or in a file system used by a running virtual environment may be corrupted. Thus, there is a need to determine the consistency of metadata of a block device used as the virtual environment disk. For example, the block device metadata may be corrupted or lost. Moreover, the file system of the virtual environment, generally, contains its own metadata and is mounted in read/write mode. As such, the metadata of the block device and metadata of the file system of the running virtual environment is continuously being updated by processes whether or not the block device and/or the file system contain errors. Checking for corruptions is complicated because the data and, thus the metadata too, of the block device and/or of the file system may be changed by the processes running in the virtual environment while the check will be in progress. For example, the file system of the virtual environment may be modified while checking operations are being performed. Current methods for checking the corruptions involve stopping the virtual environment, killing guest processes which were in progress, unmounting the block device and/or the file system of the virtual environment, etc. Moreover, there are no guarantees that the stopped virtual environment with the corrupted data and/or metadata will be able to be started again. Moreover, in case of a corruption, it becomes unsafe to unmount block device and/or file system of the virtual environment, because there are no guarantees that subsequent mount operation will success. Generally, stopping of the virtual environment involves unmounting of the block device and/or file system of the virtual environment.

Therefore, there is a need for improving methods and systems for detecting corruptions in file system metadata and block device metadata of a virtual environment.

SUMMARY

Accordingly, a system and a method are provided for improving fault tolerance. In one aspect, the system comprises a system for detecting container block device and file system inconsistencies implemented in a computing device comprising one or more processors, and a storage (e.g., including at least one physical block device), the one or more processors configured to: perform a method for detecting container block device and file system inconsistencies, the method including: performing consistency check on the block device metadata retrieved without stopping I/O operations to the block device for the container; when an inconsistency is detected on the block device metadata retrieved without stopping I/O operations to the block device for the container, temporarily stopping I/O operations to the block device for the container, retrieving block device metadata while the I/O operations to the block device for the container are temporarily stopped, allowing the I/O operations to the block device for the container to resume when the retrieval of the block device metadata is completed, performing consistency check on the block device metadata retrieved while the I/O operations to the block device for the container were temporarily stopped; when no inconsistency is detected on the block device metadata retrieved without stopping I/O operations to the block device for the container or no inconsistency is detected on the block device metadata retrieved while the I/O operations to the block device for the container were temporarily stopped performing consistency check on the file system of the container based on a snapshot of the block device having a state of the file system therein.

In one aspect, the method comprises: performing, by a processor of a computing device, consistency check on the block device metadata retrieved without stopping I/O operations to the block device for the container; when an inconsistency is detected on the block device metadata retrieved without stopping I/O operations to the block device for the container, temporarily stopping I/O operations to the block device for the container, retrieving block device metadata while the I/O operations to the block device for the container are temporarily stopped, allowing the I/O operations to the block device for the container to resume when the retrieval of the block device metadata is completed, performing consistency check on the block device metadata retrieved while the I/O operations to the block device for the container were temporarily stopped; when no inconsistency is detected on the block device metadata retrieved without stopping I/O operations to the block device for the container or no inconsistency is detected on the block device metadata retrieved while the I/O operations to the block device for the container were temporarily stopped performing consistency check on the file system of the container based on a snapshot of the block device having a state of the file system therein.

In one aspect, the present disclosure describes a non-transitory computer readable medium storing thereon computer executable instructions for detecting container block device and file system inconsistencies, including instructions for: performing consistency check on the block device metadata retrieved without stopping I/O operations to the block device for the container; when an inconsistency is detected on the block device metadata retrieved without stopping I/O operations to the block device for the container, temporarily stopping I/O operations to the block device for the container, retrieving block device metadata while the I/O operations to the block device for the container are temporarily stopped, allowing the I/O operations to the block device for the container to resume when the retrieval of the block device metadata is completed, performing consistency check on the block device metadata retrieved while the I/O operations to the block device for the container were temporarily stopped; when no inconsistency is detected on the block device metadata retrieved without stopping I/O operations to the block device for the container or no inconsistency is detected on the block device metadata retrieved while the I/O operations to the block device for the container were temporarily stopped performing consistency check on the file system of the container based on a snapshot of the block device having a state of the file system therein.

In one aspect, an inconsistency is detected on the block device metadata retrieved while the I/O operations to the block device for the container were temporarily stopped or on the file system of the container taking one or more on-error actions. In one aspect, the retrieving of the block device metadata without stopping I/O operations to the block device for the container and/or the retrieving of the block device metadata while the I/O operations to the block device for the container are temporarily stopped comprises:

retrieving in-memory copy of the block device metadata via an interface to OS kernel. In one aspect, the retrieving of the block device metadata without stopping I/O operations to the block device for the container and/or the retrieving of the block device metadata while the I/O operations to the block device for the container are temporarily stopped comprises: sending a command to the OS kernel to synchronize changes made to in-memory copy of the block device metadata with the block device metadata stored in the container disk image; and upon completion of the synchronization, retrieving the block device metadata from the container disk image. In one aspect, the retrieving of the block device metadata without stopping I/O operations to the block device for the container and/or the retrieving of the block device metadata while the I/O operations to the block device for the container are temporarily stopped comprises: retrieving at least a part of block device metadata from the container disk image. In one aspect, the performing of the consistency check on the block device metadata comprises at least one of: checking for absences of blocks of data, and checking for duplicates of blocks of data. In one aspect, the on-error actions comprise at least one of: sending notification to container user or administrator; backing up container data; curing the metadata of the block device; curing the metadata of the file system; repairing inconsistencies; and applying any other technique known in the art to mitigate the error and/or cure the metadata. In one aspect, performing of the consistency check on the file system of the container based on the snapshot of the block device comprises: temporarily stopping I/O operations to the block device for the container; synchronizing the file system metadata; creating the snapshot of the block device having a state of the file system therein; allowing the container to resume I/O operations; exposing the created snapshot as a new block device; creating a read-only mount of the file system from the new block device; and performing read-only file system metadata consistency check. In one aspect, performing of the consistency check on the file system of the container based on the snapshot of the block device further comprises deleting the created snapshot of the block device.

The above summary of example aspects serves to provide an understanding of the teachings of the present disclosure. This summary is not an extensive overview of all contemplated aspects, and is intended to neither identify key or critical elements of all aspects nor delineate the scope of any or all aspects of the disclosure. Its sole purpose is to present one or more aspects in a concise form as a prelude to the more detailed description of the disclosure that follows. To the accomplishment of the foregoing, the one or more aspects of the methods and systems of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Figure 1:
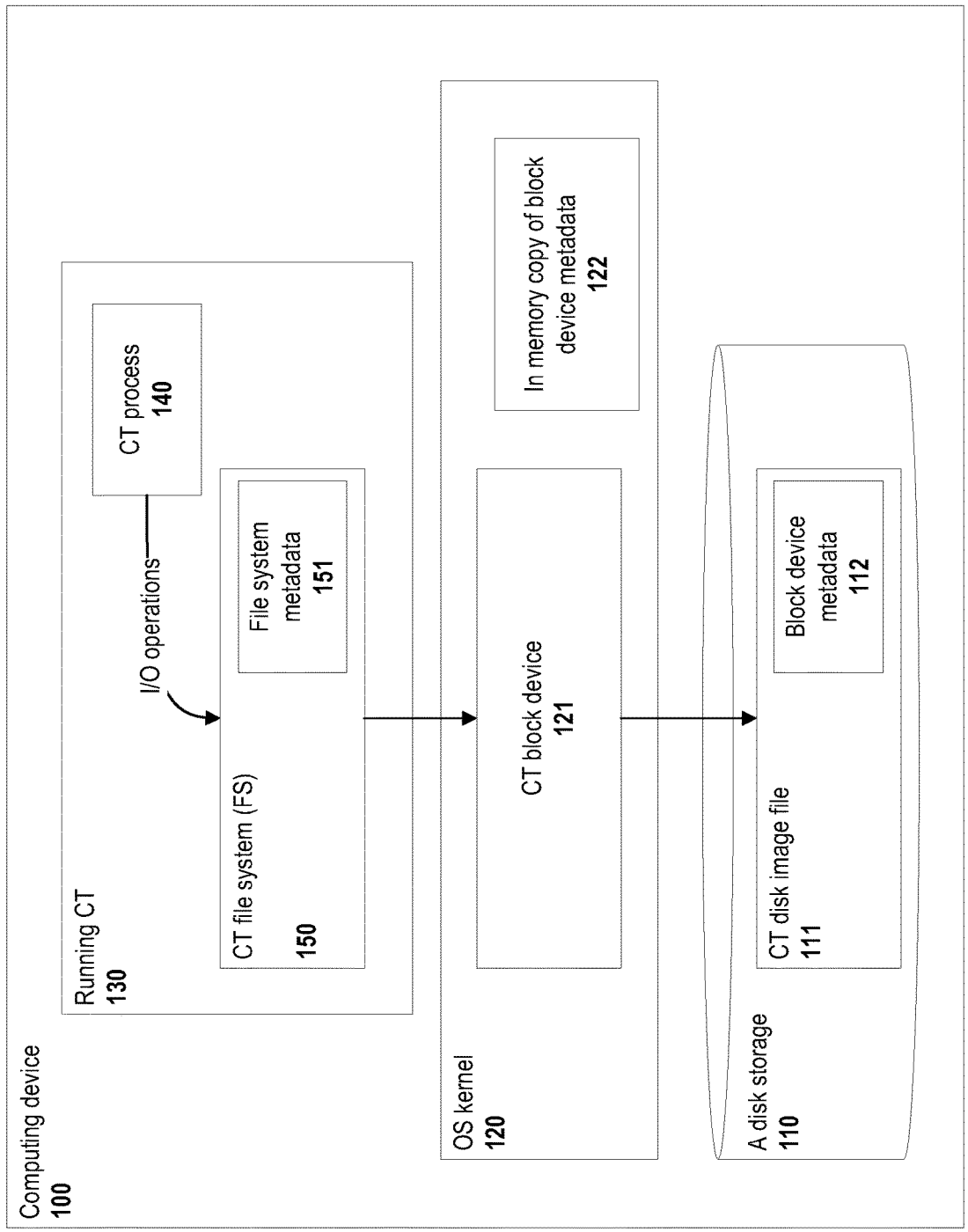
FIG. 1 is a block diagram of a computing device in which system and method for detecting container block device and file system corruptions without terminating processes running in the container are implemented in accordance with the teachings of the present disclosure.

Various exemplary aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a description of one or more exemplary aspects in order to provide a basic understanding of the disclosed system and method. This description is not an extensive overview of all contemplated aspects, and is not intended to identify key or critical elements of all aspects nor delineate the scope of any or all aspects.

The exemplary aspects are described in the context of a system, method and computer program product for checking block device metadata and file system metadata of a virtual environment without stopping the virtual environment.

In order to add clarity, some terms and phrases used in describing aspects of the present disclosure are defined below:

In one aspect, the virtual environment may be a virtual machine (VM), or a container (CT), or any kind of isolated environment. In one aspect, a virtual environment is a Virtual Execution Environment (VEE) which is a type of isolated environment that supports program code execution. Examples of VEEs can be any kind of virtual machines (VMs, including lite VMs), containers (including OS containers, stateless containers, or execution containers), and the like. In some aspects, from the point of view of the user or a process running in the VEE, the code in a virtual execution environment (VEE) runs as if it were running on the real computing system. In one aspect, at least a part of the real hardware or software utilized for running program code is presented in the VEE as their virtual analogs.

In one aspect, a container (CT) (e.g., including OS containers, stateless containers, or execution containers) is an isolated environment (e.g., a type of virtual execution environment) that supports program code execution. In some aspects, isolation of containers is implemented on the namespace level. In some aspects, a container is defined as a group of processes isolated from other processes running on the computing device. In some aspects, containers running on the same computing device, share the OS kernel of the computing device and at least some of the system resources. In some aspects, multiple sets of applications or services are organized on a single hardware system by placing them into isolated containers.

In one aspect, a disk of a virtual environment (e.g., a container, a virtual machine, and so forth) may be represented by a software-defined block device (e.g., a virtual block device, a virtual disk, etc.). In such aspect, data of the virtual execution environment is stored in one or more files, which are backing files for the block device, e.g., in a virtual execution environment disk image, etc.

In one aspect, a virtual disk refers to a software component that emulates an actual disk, such as an optical disc drive, a floppy disk drive, or a hard disk drive. To other programs, a virtual disk looks and behaves like an actual physical device. A virtual disk may be in any of the following forms: Disk image, a computer file that contains the exact data structure of an actual storage device; Logical disk (also known as vdisk), an array of two or more actual drives that cooperatively act like a single device; and a RAM disk, which stores its data in random-access memory (RAM) instead of on a storage device.

In some aspects, a block device that represents a virtual environment disk comprises a software-defined block device (e.g., a virtual block device, a thin provisioning device, etc.), which can be a representation of data stored in a backing file or a set of backing files (e.g., a virtual environment disk image, such as container disk image). Such block device may be provided to a process or a container, or a virtual machine, which then is able to work with the block device as with a hardware block device. In one aspect, a block device may be a pseudo-device that makes a computer file (backing file or files) accessible as a block device.

In one aspect, backing file is a file (or a set of files; e.g. a container disk image) that stores data for a block device (e.g., for virtual block device, virtual disk, VEE virtual disk), wherein a mapping exists between of blocks of block device (or their offsets) and blocks (or a set of blocks) in the file (or their offsets in the file). In some aspects, backing file(s) may have a complex structure and retrieve data from one or more hardware storage devices or retrieve data from a network as part of storing data and metadata for the block device. Further, the backing file(s) may have a layered structure where each layer contains changes made to the previous layer. For instance, when a portion of data is needed (e.g., that shall be represented by a data block of the block device) a top layer is searched and if the portion of data is not found in the top layer underlying layers can be searched until the portion of data is found. In one aspect, backing file may be in a format describing the block device (e.g., a loop back block device, ploop, qcow2, or etc.).

In one aspect, a "block device" used in this disclosure (e.g., container block device) may be represented by any software component that stores its data in a physical storage (local, or network, etc.). In one aspect, for example, a block device may be created by an operating system (OS) kernel based on data stored (e.g., locally, on a shared storage, on a network storage, or on a distributed storage, etc.) for a computing device. An example of a block device is a device created locally from a container (CT) disk image.

In one aspect, an example of a block device may be: a loop block device, vnd (vnode disk), or lofi (loop file interface), a pseudo-device that makes a file accessible as a block device. The loop device is a block device that maps its data blocks not to a physical device such as a hard disk or optical disk drive, but to the blocks of a regular file in a file system or to another block device. This can be useful, for example, to provide a block device for a file system image stored in a file, so that it can be mounted with the mount command.

Ploop is a disk loop back block device, not unlike loop but with many features like dynamic resize, snapshots, backups etc. The Ploop allows container file systems to be placed in a file.

In one aspect, the block device of the present disclosure has a capability to make a snapshot.

The teachings of the present disclosure may be practiced in conjunction with any type of operating systems. As such, most of the above terms are applicable for all types of operating systems, including Windows and Linux operating systems. In some cases, e.g., "ploop" is used in limited types of operating systems. It is noted that any other image formats may also be used for purposes of the present disclosure.

Returning to the teachings of the present disclosure, exemplary aspects are described below for checking block device metadata and file system metadata of a virtual environment without stopping the virtual environment. While the various actions in the exemplary methods are discussed in a particular order, it is to be appreciated that the actions can be performed in different orders than those depicted and at least some of the actions may be performed concurrently with one another.

FIG. 1 is a block diagram of a computing device 100 in which the method for detecting container block device and file system inconsistencies (corruptions) without terminating processes running in the container may be implemented in accordance with the teachings of the present disclosure.

Figure 7:
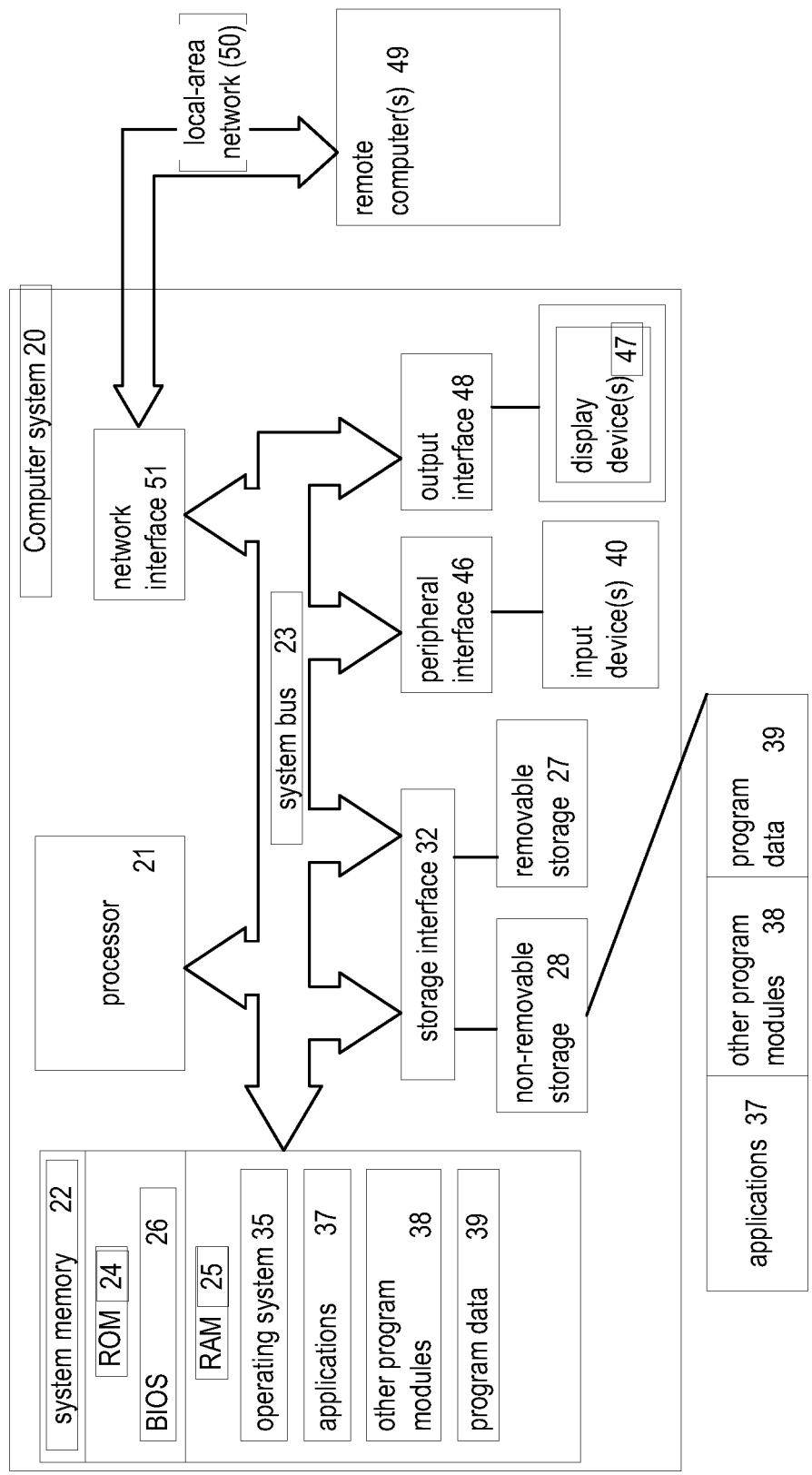
FIG. 7 is a block diagram illustrating a general-purpose computer system on which aspects of the present disclosure may be implemented in accordance with an exemplary aspect.

The computing device 100 includes one or more processors, storage components, an operating system, etc., as described in FIG. 7. In one aspect, the computing device 100 may be representative of a plurality of different devices, such as, for example, distributed systems or multiple servers utilized to perform operations "over the cloud". The computing device 100 further, optionally, includes a disk storage 110 or a storage access module (e.g., able to connect to a local or a network storage). In one aspect, the storage 110 may be a part of a computing device, or be connected to the computing device via network, etc. In one aspect, the storage may store data locally, or via network, may be a shared storage, a distributed storage, a network storage, be a physical storage device (e.g., a physical block device, a RAM, hard disk, etc.), be another virtual block device, or etc. The computing device 100 further includes an OS kernel 120, and a running container (CT) 130. The container processes 140 associated with the running container 130 perform I/O operations on the container file system 150. The container file system 150 contains its own metadata 151. The container file system (FS) resides on a block device, such as a container block device, which may be a software block device representing data stored in the block device backing file, such as a container disk image file 111. For example, the OS kernel 120 maintains the container block device 121 and, in some aspects, uses the in-memory copy 122 (e.g., in memory cache) of the metadata of the block device 121. In one aspect, in the memory copy of the block device metadata is used by the OS kernel, and, for example, contains changes to the block device metadata (and/or data), that is stored in the container disk image, made by the OS kernel during processing of the input output (I/O) requests from the container processes to the block device. In one aspect, in the memory metadata copy 122 is at least a part of container block device metadata loaded in memory from the container disk image. The disk storage 110 is used to store and provide access to the container disk image file 111, which contains the data for the block device, and the block device metadata 112 (e.g., also called container image metadata in some aspects). In one aspect, periodically, the OS kernel 120 synchronizes the in memory (cached) data and metadata to the disk storage 110.

Figure 2:
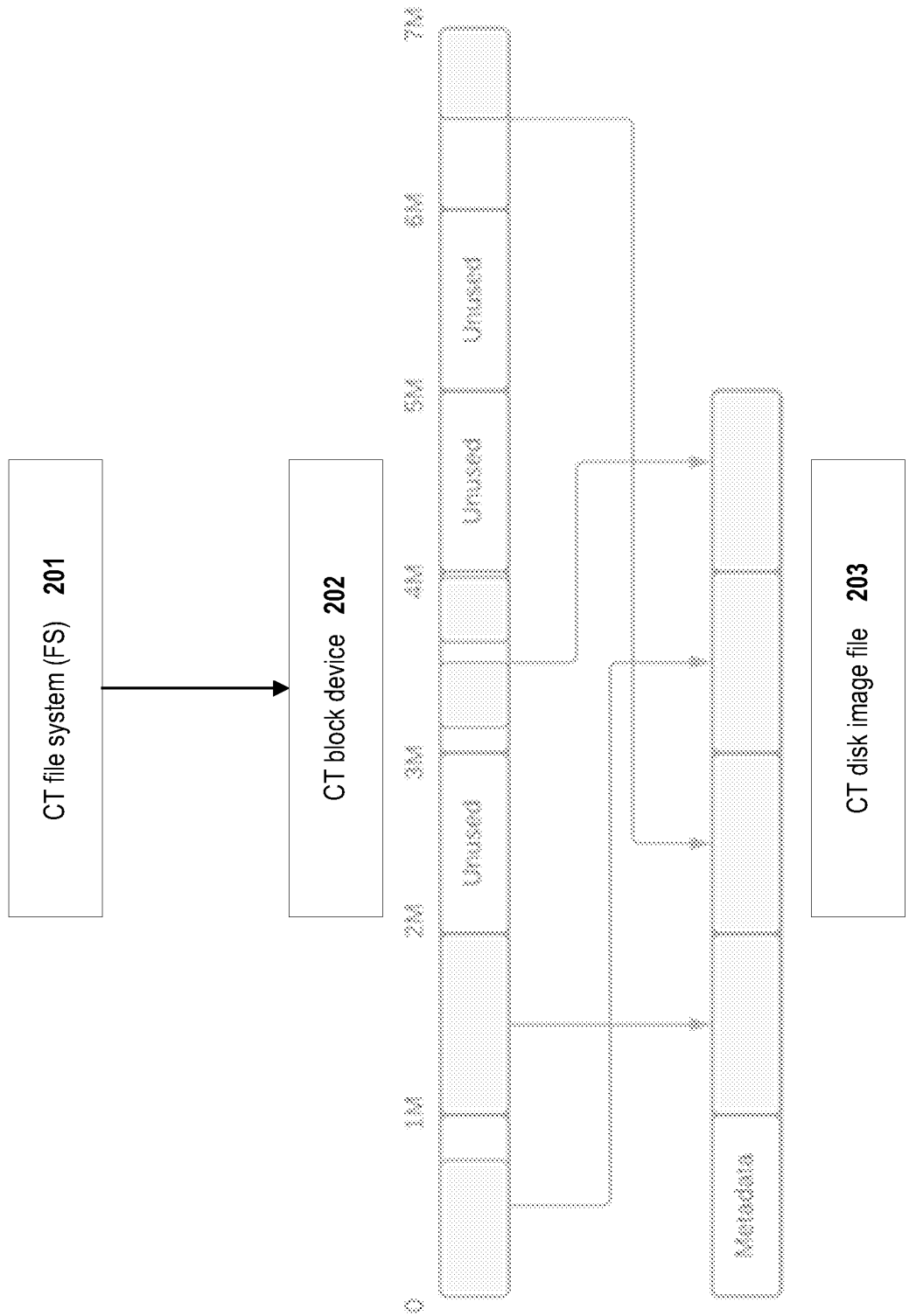
FIG. 2 is an example of a block device in accordance with one aspect of the present disclosure.

FIG. 2 is an example of a block device 202 in accordance with one aspect of the present disclosure. The block device 202 comprises a virtual block device (e.g., a loopback block device). The block device 202 is used as an underlying block device for the container file system 201, and represents data which is stored in the container disk image file (or a set of files) 203, which is a backing file(s) for the container block device 202. The figure shows a mapping (e.g., piecewise linear transformation, etc.) between the blocks of the container block device 202 and the container image file 203 and an exemplary inner structure of the container block device 202 and the container image file 203.

Figure 3:
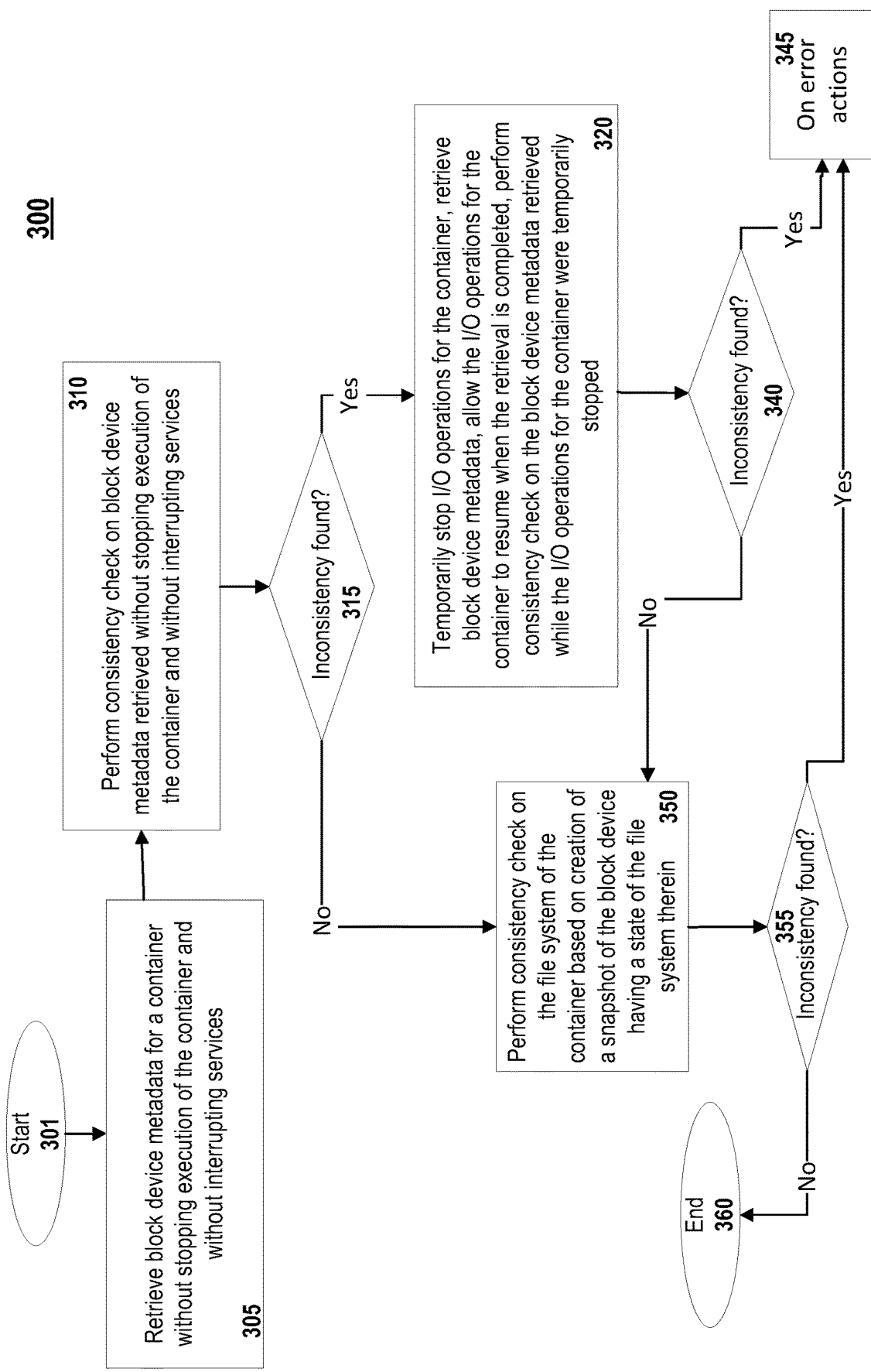
FIG. 3 illustrates a flowchart of a method for detecting container block device and file system corruptions without stopping container processes and services in accordance with the present disclosure.

FIG. 3 illustrates a flowchart of a method 300 for detecting container block device and file system inconsistencies (corruptions) without stopping container processes and services in accordance with the present disclosure. For example, a method for detecting inconsistencies may be implemented in the computing device 100 shown in FIG. 1 or in FIG. 7.

Method 300 starts in step 301 and proceeds to step 305.

In step 305, method 300, retrieves block device metadata for a container without stopping execution of the container and without interrupting services running in the container.

In step 310, method 300, performs consistency check on the container block device metadata retrieved without stopping execution of the container and without interrupting services.

In step 315, method 300, determines whether or not an inconsistency is detected on the block device metadata retrieved without stopping execution of the container and without interrupting services. When an inconsistency is detected, method 300, proceeds to step 320. Otherwise, method 300 proceeds to step 350.

In one aspect, in order to perform the consistency check, the container block device metadata (e.g., block device metadata that is stored in the container disk image, or in the memory copy of the block device metadata that is used by the OS kernel) is loaded into a block device metadata consistency check utility (e.g., during the step 310 and/or 320).

In one aspect, an inconsistency may be detected at the step 310, either because the metadata has changed (e.g., by container processes) during the time period in which the steps 305 and 310 of the method 300 were being executed; or because of actual errors in the metadata. In such case, the step 320 is used to determine whether the errors do exist.

In step 320, method 300, temporarily stops I/O operations for the container (e.g., temporarily stops handling at least some I/O operations for the container (e.g., write operations, read operations, sync operations, etc.) and/or temporarily stops execution of at least one container process), retrieves block device metadata while the I/O operations to the block device (e.g., 121) of the container are temporarily stopped, allows the I/O operations for the container to resume (e.g., resume handling the at least some I/O operations and/or continue execution of the at least one container process from the point at which it was temporarily stopped) when the retrieval of the block device metadata is completed, performs consistency check on the block device metadata, which was retrieved while the I/O operations for the container were temporarily stopped. The temporary stop may be considered as a pause. In one aspect, for instance, guest processes are frozen such as current activities are temporarily interrupted while metadata is being retrieved. Then, the interrupted processes are allowed to resume execution. In one aspect, the I/O operations handling continue in the background while the retrieved metadata is being processed to detect corruptions.

In step 340, method 300 determines whether or not an inconsistency is detected on the block device metadata retrieved while the I/O operations for the container were temporarily stopped. When an inconsistency is detected, method 300 proceeds to step 345. Otherwise, method 300 proceeds to step 350.

In step 345, method 300 takes on-error actions (actions performed upon detection of inconsistency or error either in the block device or in the file system of the container, which in turn may mean that user data is corrupted or has risk of being corrupted or lost). In one aspect, the on-error actions comprise at least one of: notify user or container administrator, or host OS administrator; backing up container data; creating a snapshot; repairing found innocuous and/or serious inconsistencies (e.g., repairing sparse images, repairing orphan files, repairing block metadata); curing the metadata (either the block device metadata or the file system metadata, depending on where the error has found); and applying any other technique known in the art to mitigate the error and/or cure the metadata (either the block device metadata or the file system metadata, depending on where the error has found).

In one aspect, the consistency checks and/or inconsistency repair actions for a block device and/or file system may be performed using utilities corresponding to the disk image format and/or file system type.

In step 350, method 300, performs consistency check on the file system of the container based on a snapshot of the block device having a state of the file system therein. In one aspect, this step may, for example, include creation of a snapshot of the block device; creating a new block device (e.g., from a snapshot of the container block device) having a state of the file system therein; and performing consistency check on the file system of the new block device.

In step 355, method 300, determines whether or not an inconsistency is detected for the file system. When an inconsistency is detected, method 300 proceeds to step 345. Otherwise, method 300 proceeds to step 360 to end the method. In one aspect, the method may report that no errors were detected for the container prior to ending. In one aspect, the method may be periodically and regularly repeated form the "start" to the "end" and, for example, notify users (e.g., user of the container or administrator of the host device) in case of any errors being detected.

In one aspect, the method 300 does not stop any container processes, does not bother or interrupt processes and user of the container, or is even not noticed by the container processes and user of the container. In one aspect, the method 300 is performed without stopping the container, without rebooting the container, without unmounting block device the container, and/or without unmounting files system of the container.

In one aspect, the method 300 (or any steps of the method) may be implemented as a process or a set of process running in the OS. In one aspect, the steps of method 300 are performed from outside of the container. In one aspect, the steps of method 300 are performed by user space components except for the temporarily stopping of the I/O operations for the container.

In some aspects, block device metadata consistency checks (e.g., those that are used, for example, at steps 310, 320, 320, 410 and/or 535) and may be performed on the block device metadata (e.g., retrieved at steps 301, 320, 405, or 525, etc.) and on, in one aspect, container disk image data. In one aspect, consistency check may check whether the block device is in a consistent state according to the corresponding format of the backing file(s) (e.g., container disk image format). In one aspect, consistency check may include any sanity checks. In one aspect, consistency check may comprise, for example, checking at least one of: block device size, block device end, absence of data blocks, duplicates of data blocks, holes in the block device, metadata records and/or metadata structure corruptions, metadata overlap checks (e.g., checks whether sections of the file that are already being used for metadata are not being overwritten), data loss, etc. In one aspect, consistency check may also take into consideration, for example, at least one of: disk images's format, whether the disk image is a sparse file or not, image file access permissions, disk initialization, number of snapshots, number of backing files, inner structure of the disk image, compression, metadata tables, reference counts for data clusters, block address table, image's flags, headers, size of metadata, size of blocks in the block device, size of blocks in the backing file (e.g., image file), image cluster block size, data clusters, sectors, partitions, and any other parameters corresponding a particular backing file format, etc.

In some aspects, file system metadata consistency checks (e.g., that is used, for example, at steps 350 and/or 680) and may be performed on the file system metadata and on, in one aspect, file system data. In one aspect, consistency check may check whether the file system is in a consistent state. In one aspect, consistency check may include any sanity checks. In one aspect, consistency check may check is performed according to the structure of the file system, e.g., data structures stored on disk, which are internal and specific to a particular file system. In one aspect, consistency check may comprise, for example, checking at least one of: data loss, inode errors, fragments of files and directories deemed as corrupt, file name overlength, invalid characters in file name, bad inode format, blocks claimed by more than one inode or by an inode outside the range of the filesystem, incorrect link counts, any kinds of size checks (e.g., including determining partially truncated files), blocks not accounted for anywhere, files and directory checks (e.g., file pointing to unallocated inode), inode number out of range, directories with unallocated blocks (holes), any kinds of super block checks, more blocks for inodes than there are in the file system, bad free block map format, total free block and/or free inode count incorrect, blocks in the free map also in files, unreferenced inodes, In one aspect, consistency check may also take into consideration, for example, at least one of: flags and/or counts cof filesystem's superblock, directory sizes, file names and paths, inode errors, volumes, descriptors, indexes, file system journal, unclean mounts, orphaned files and directories (allocated but unreferenced), etc. In one aspect, consistency check may be performed by a tool or an utility corresponding to the operating system and file system, for example, "fsck", "Microsoft ScanDisk", "CHKDSK", etc.

In one aspect, checks used for block device consistency check may also be used for file system consistency check if applicable and vice versa.

In one aspect, different checks may be performed in parallel.

Figure 4:
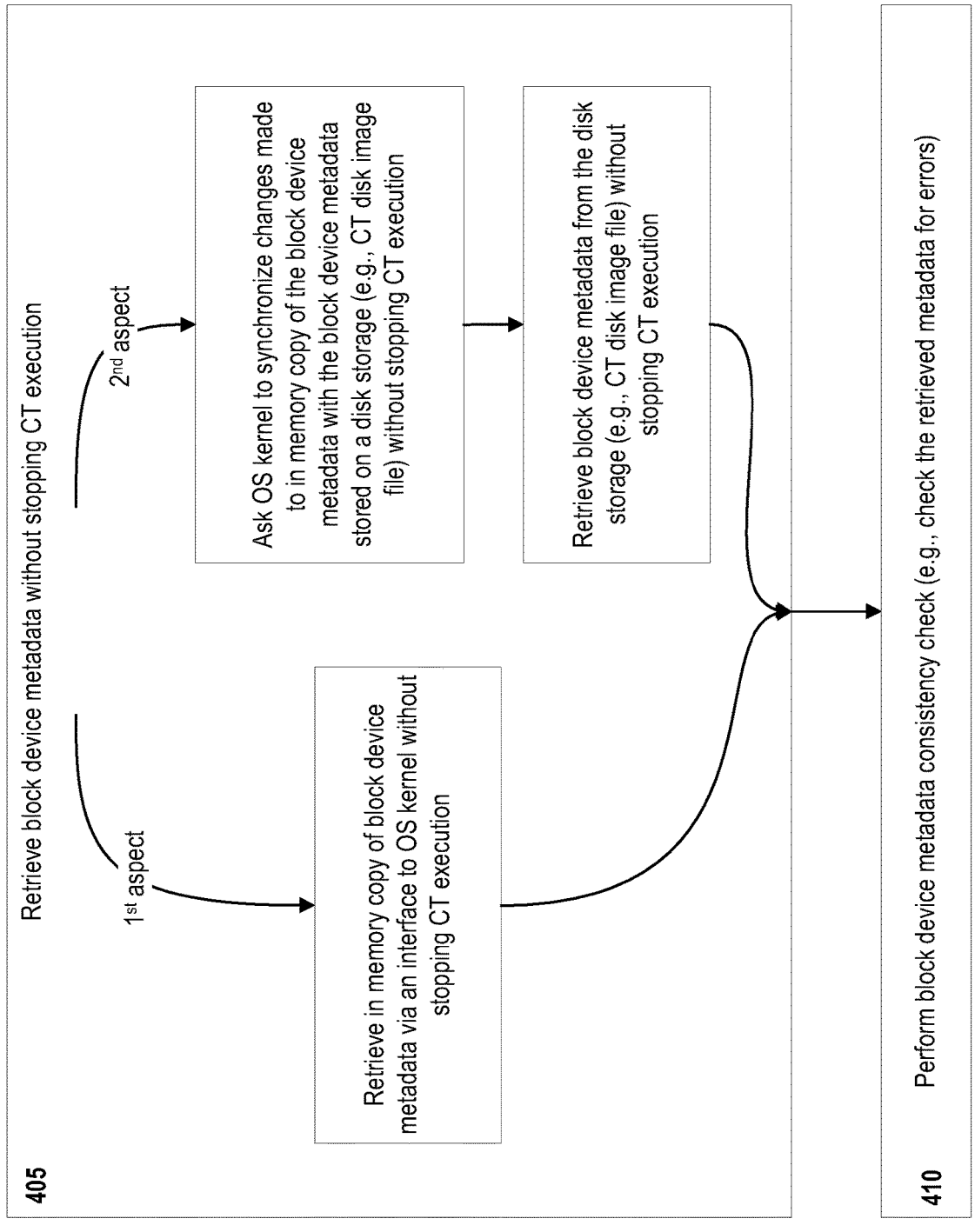
FIG. 4 illustrates an exemplary block diagram of a method 400 for performing consistency check on the block device metadata retrieved without stopping execution of the container and without interrupting services in accordance with the present disclosure.

FIG. 4 illustrates an exemplary block diagram of a method 400 for performing consistency check on the block device metadata retrieved without stopping execution of the container and without interrupting services in accordance with the present disclosure. For example, steps 305 and 310 of FIG. 3 may be implemented using method 400.

In step 405, method 400, retrieves block device metadata (e.g., a least a part of the block device metadata) for a container without stopping execution of the container and without interrupting services performed by the container. In one aspect, the retrieving of the block device metadata may comprise retrieving at least a part of the block device metadata from the disk image and/or from the in-memory copy.

In one aspect, the retrieval of the block device metadata comprises: retrieving in-memory copy of the block device metadata (e.g., 122) via an interface to OS kernel without stopping execution of the container. In one aspect, the interface to the kernel, used for retrieval of the container block device metadata, may be a system call, a state file, an Input-Output Control (IOCTL). The IOCTL, for example, may be created for a system based on its device specific operations. In one aspect, the in-memory copy may be just a part of the metadata of the block device. In one aspect, missing metadata, such as block device metadata not present in memory, is additionally retrieved from the container disk image.

In one aspect, the retrieval of the block device metadata comprises: sending a command to the OS kernel to synchronize changes made to in-memory copy of the block device metadata with the block device metadata stored on a disk storage (e.g., the CT disk image file) without stopping execution of the container; and upon completion of the synchronization, retrieving the block device metadata from the disk storage without stopping execution of the container.

In step 410, method 400, performs consistency check on the block device metadata retrieved without stopping execution of the container and without interrupting container services. Examples, of the block device metadata consistency check are described in relation to FIG. 3. This step is performed regardless of the aspect used in implementing step 405. When an inconsistency is detected, method 400 proceeds to step 345. Otherwise, method 400 proceeds to step 360.

Figure 5:
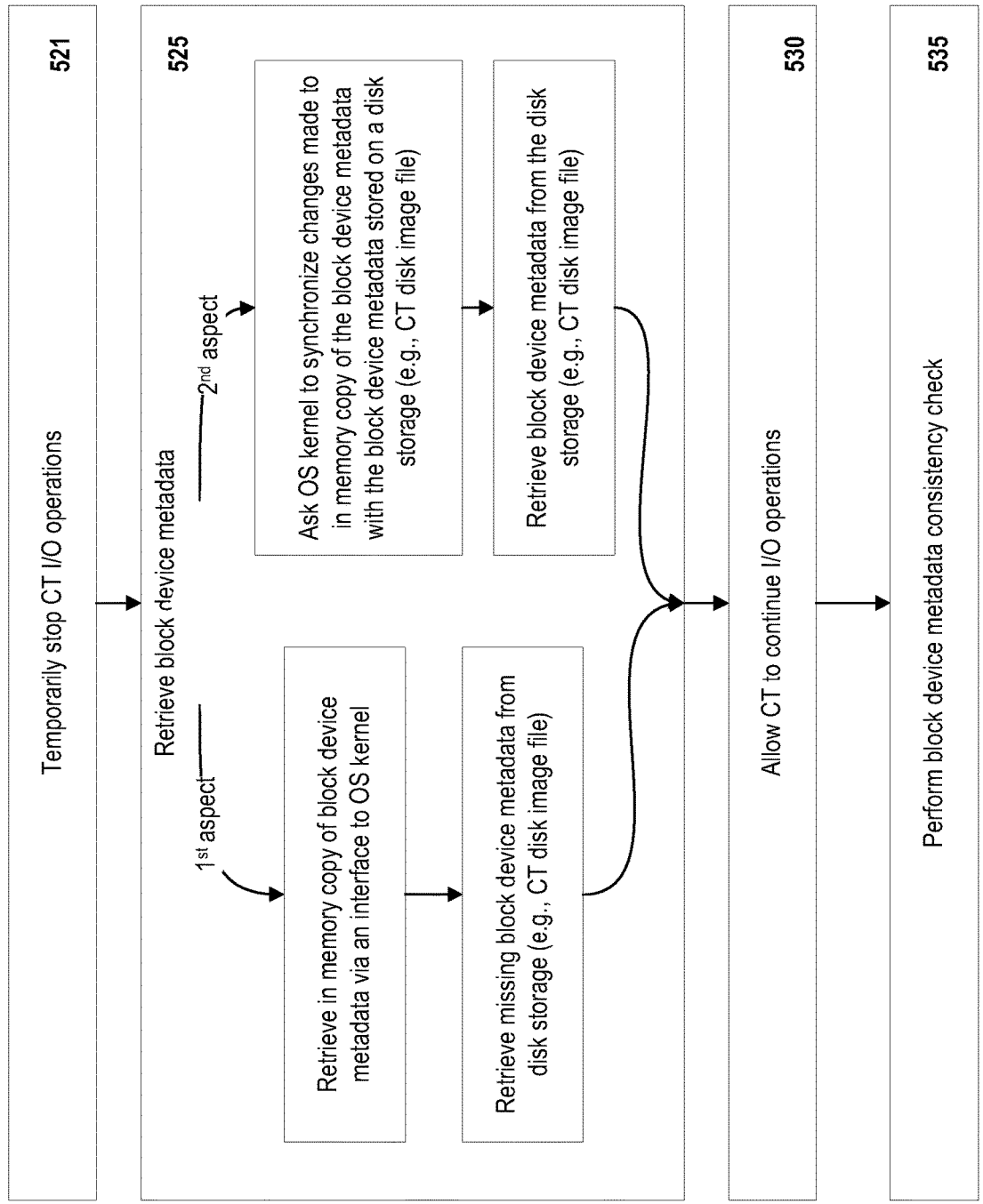
FIG. 5 illustrates an exemplary block diagram of a method 500 for performing consistency check on the block device metadata retrieved while the I/O operations for the container were temporarily stopped in accordance with the present disclosure.

FIG. 5 illustrates an exemplary block diagram of a method 500 for performing consistency check on the block device metadata retrieved while the I/O operations for the container were temporarily stopped in accordance with the present disclosure. For example, step 320 of FIG. 3 may be implemented using method 500.

In step 521, method 500, temporarily stops I/O operations for the container. In one aspect, this may be achieved by placing the container processes in the "freezer" cgroup (control group).

In step 525, method 500, retrieves block device metadata (e.g., a least a part of the block device metadata) while the I/O operations for the container are temporarily stopped. In one aspect, the retrieving of the block device metadata may comprise retrieving at least a part of the block device metadata from the disk image and/or from the in-memory copy.

In one aspect, the retrieving of the block device metadata while the I/O operations for the container are temporarily stopped comprises: retrieving in-memory copy of the block device metadata via an interface to OS kernel while the I/O operations for the container are temporarily stopped. In one aspect, the retrieving of the block device metadata while the I/O operations for the container are temporarily stopped further comprises retrieving at least a part of block device metadata from storage (e.g., from CT disk image file(s)) while the I/O operations for the container are temporarily stopped. For example, when metadata for some data blocks of the block device is not present in memory, such metadata may be read from the container disk image.

In one aspect, the retrieving of the block device metadata while the I/O operations for the container are temporarily stopped comprises: sending a command to the OS kernel to synchronize changes made to in-memory copy of the block device metadata with the block device metadata stored on a storage (e.g., in the CT disk image file) while the I/O operations for the container are temporarily stopped; and upon completion of the synchronization, retrieving the block device metadata from the disk storage while the I/O operations for the container are temporarily stopped. For example, write the cached metadata (and optionally data) to the container disk image (e.g., by sync operation) and read the metadata from the disk image.

In step 530, when the retrieval of the block device metadata is completed, method 500, allows the I/O operations for the container to resume. In one aspect, for example, this may be achieved by changing the cgroup (control group) of the container processes.

In step 535, method 500 performs consistency check on the block device metadata retrieved while the I/O operations for the container were temporarily stopped. When an inconsistency is detected, method 500 proceeds to step 345. Otherwise, method 500 proceeds to step 360.

In one aspect, the consistency check on the block device metadata retrieved while the I/O operations for the container were temporarily stopped comprises at least one of: checking for absences of blocks of data, and checking for duplicates of blocks of data.

Figure 6:
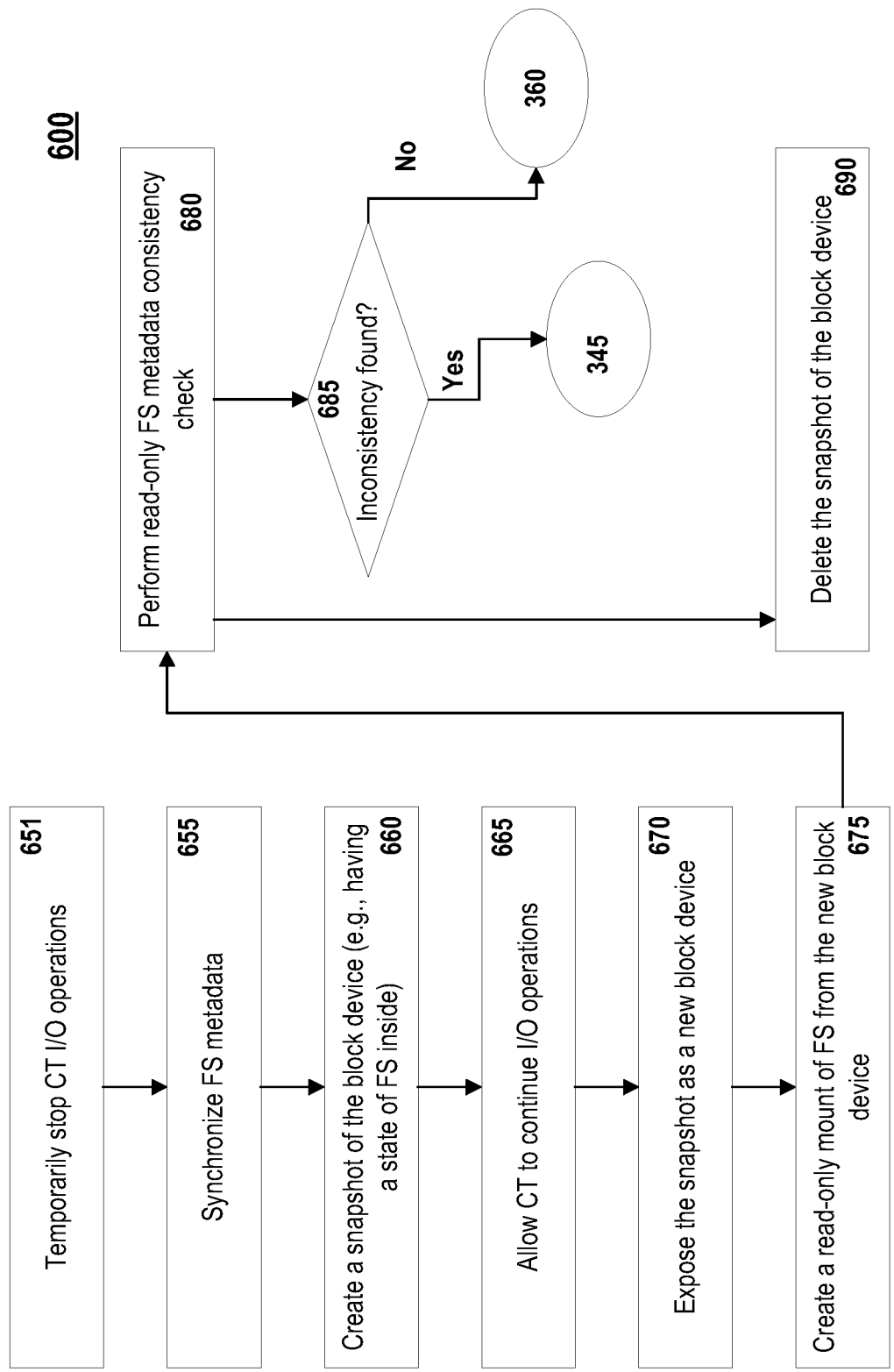
FIG. 6 illustrates an exemplary block diagram of a method 600 for performing consistency check on the file system of the container based on creation of a snapshot of the block device having a state of the file system therein in accordance with aspects of the present disclosure.

FIG. 6 illustrates an exemplary block diagram of a method 600 for performing consistency check on the file system of the container based on creation of a snapshot of the block device having a state of the file system therein in accordance with aspects of the present disclosure. For example, step 350 of FIG. 3 may be implemented using method 600.

In step 651, method 600, temporarily stops I/O operations for the container. In one aspect, this may be achieved in the same ways as described for steps 320, 350 and 521.

In one aspect, methods 500 and 600 may overlap, for example, temporarily stop container I/O operations (e.g., is 521 or 651), then perform retrieving block device metadata 525 and retrieving file system metadata steps 655 and 660, wherein 525 and 660 may also have some common steps, and then allow container I/O operations for the container (which is 530 or 665); after that both methods may work independently.

In step 655, method 600, synchronizes the file system metadata. In one aspect, for example, it may be achieved by writing cached changes to the file system to disk (e.g., the container block device).

In step 660, method 600, creates a snapshot of the block device 121 having a state of the file system therein. In one aspect, the snapshot may involve creation of additional backing file (e.g., as part of the container disk image). In one aspect, the snapshot may be read-write, read-only, or etc.

In step 665, method 600, allows the container to resume I/O operations. In one aspect, this may be achieved, for example, like it was described for steps 320 and/or 530.

In step 670, method 600, exposes the snapshot created in step 660 as a new block device. In one aspect, this may be done by creating an empty image and assembling a block device (e.g., loop back block device) from the snapshot and the empty image or, in another aspect, from a base image and the empty image.

In step 675, method 600, create a read-only mount of the file system from the new block device.

In step 680, method 600, perform read-only file system metadata consistency check. For example, for Linux operating systems, a "fsck" utility may be used. For other operating systems, consistency utility tools of the respective operating systems may be used. Further examples, of the file system metadata consistency check are described in relation to FIG. 3.

In step 685, method 600, determines whether or not an inconsistency is detected for the file system. When an inconsistency is detected, method 600 proceeds to step 345. Otherwise, method 600 proceeds to step 360.

In one aspect, method 600 further comprises a step 690, wherein the method 600 deletes the snapshot of the block device that was created in step 660.

FIG. 7 is a block diagram illustrating a computer system 20 on which aspects of systems and methods for detecting container block device and file system corruptions without stopping container processes and services in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 7, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method for detecting container block device and file system inconsistency, comprising:
    performing, by a processor of a computing device, consistency check on the block device metadata retrieved without stopping I/O operations to the block device for the container, the performing of the consistency check on the file system of the container being based on a snapshot of the block device, wherein the performing of the consistency check on the file system of the container based on the snapshot of the block device comprises:
        temporarily stopping I/O operations to the block device for the container;
        synchronizing the file system metadata;
        creating the snapshot of the block device having a state of the file system therein;
        allowing the container to resume I/O operations;
        exposing the created snapshot as a new block device;
        creating a read-only mount of the file system from the new block device; and
        performing read-only file system metadata consistency check;
    when an inconsistency is detected on the block device metadata retrieved without stopping I/O operations to the block device for the container, temporarily stopping I/O operations to the block device for the container, retrieving block device metadata while the I/O operations to the block device for the container are temporarily stopped, allowing the I/O operations to the block device for the container to resume when the retrieval of the block device metadata is completed, performing consistency check on the block device metadata retrieved while the I/O operations to the block device for the container were temporarily stopped; and
    when no inconsistency is detected on the block device metadata retrieved without stopping I/O operations to the block device for the container or no inconsistency is detected on the block device metadata retrieved while the I/O operations to the block device for the container were temporarily stopped performing consistency check on the file system of the container based on a snapshot of the block device having a state of the file system therein.

2. The method of claim 1, wherein when an inconsistency is detected on the block device metadata retrieved while the I/O operations to the block device for the container were temporarily stopped or on the file system of the container taking one or more on-error actions.

3. The method of claim 1, wherein the retrieving of the block device metadata without stopping I/O operations to the block device for the container and/or the retrieving of the block device metadata while the I/O operations to the block device for the container are temporarily stopped comprises:
    retrieving in-memory copy of the block device metadata via an interface to OS kernel.

4. The method of claim 1, wherein the retrieving of the block device metadata without stopping I/O operations to the block device for the container and/or the retrieving of the block device metadata while the I/O operations to the block device for the container are temporarily stopped comprises:
    sending a command to the OS kernel to synchronize changes made to in-memory copy of the block device metadata with the block device metadata stored in the container disk image; and
    upon completion of the synchronization, retrieving the block device metadata from the container disk image.

5. The method of claim 1, wherein the retrieving of the block device metadata without stopping I/O operations to the block device for the container and/or the retrieving of the block device metadata while the I/O operations to the block device for the container are temporarily stopped comprises:
    retrieving at least a part of block device metadata from the container disk image.

6. The method of claim 1, wherein the performing of the consistency check on the block device metadata comprises at least one of: checking for absences of blocks of data, and checking for duplicates of blocks of data.

7. The method of claim 1, wherein the on-error actions comprise at least one of:
    sending notification to container user or administrator;
    backing up container data;
    curing the metadata of the block device;
    curing the metadata of the file system;
    repairing inconsistencies; and
    applying any other technique known in the art to mitigate the error and/or cure the metadata.

8. The method of claim 1, further comprising:
    deleting the created snapshot of the block device.

9. A system for detecting container block device and file system inconsistencies, the system comprising a computing device comprising at least one processor, the at least one processor configured to
    perform a method for detecting container block device and file system inconsistencies, the method including:
        performing consistency check on the block device metadata retrieved without stopping I/O operations to the block device for the container, the performing of the consistency check on the file system of the container being based on a snapshot of the block device, wherein the performing of the consistency check on the file system of the container based on the snapshot of the block device comprises:
temporarily stopping I/O operations to the block device for the container;
synchronizing the file system metadata;
creating the snapshot of the block device having a state of the file system therein;
allowing the container to resume I/O operations; exposing the created snapshot as a new block device;
creating a read-only mount of the file system from the new block device; and
performing read-only file system metadata consistency check;
when an inconsistency is detected on the block device metadata retrieved without stopping I/O operations to the block device for the container, temporarily stopping I/O operations to the block device for the container, retrieving block device metadata while the I/O operations to the block device for the container are temporarily stopped, allowing the I/O operations to the block device for the container to resume when the retrieval of the block device metadata is completed, performing consistency check on the block device metadata retrieved while the I/O operations to the block device for the container were temporarily stopped;
when no inconsistency is detected on the block device metadata retrieved without stopping I/O operations to the block device for the container or no inconsistency is detected on the block device metadata retrieved while the I/O operations to the block device for the container were temporarily stopped performing consistency check on the file system of the container based on a snapshot of the block device having a state of the file system therein.

10. The system of claim 9, wherein when an inconsistency is detected on the block device metadata retrieved while the I/O operations to the block device for the container were temporarily stopped or on the file system of the container taking one or more on-error actions.

11. The system of claim 9, wherein the retrieving of the block device metadata without stopping I/O operations to the block device for the container and/or the retrieving of the block device metadata while the I/O operations to the block device for the container are temporarily stopped comprises:
retrieving in-memory copy of the block device metadata via an interface to OS kernel.

12. The system of claim 9, wherein the retrieving of the block device metadata without stopping I/O operations to the block device for the container and/or the retrieving of the block device metadata while the I/O operations to the block device for the container are temporarily stopped comprises:
sending a command to the OS kernel to synchronize changes made to in-memory copy of the block device metadata with the block device metadata stored in the container disk image; and
upon completion of the synchronization, retrieving the block device metadata from the container disk image.

13. The system of claim 9, wherein the retrieving of the block device metadata without stopping I/O operations to the block device for the container and/or the retrieving of the block device metadata while the I/O operations to the block device for the container are temporarily stopped comprises:
retrieving at least a part of block device metadata from the container disk image.

14. The system of claim 9, wherein the performing of the consistency check on the block device metadata comprises at least one of: checking for absences of blocks of data, and checking for duplicates of blocks of data.

15. The system of claim 9, wherein the on-error actions comprise at least one of:
sending notification to container user or administrator;
backing up container data;
curing the metadata of the block device;
curing the metadata of the file system;
repairing inconsistencies; and
applying any other technique known in the art to mitigate the error and/or cure the metadata.

16. The system of claim 9, further comprising:
deleting the created snapshot of the block device.

17. A non-transitory computer readable medium storing thereon computer executable instructions for detecting container block device and file system inconsistency, including instructions for:
performing consistency check on the block device metadata retrieved without stopping I/O operations to the block device for the container, the performing of the consistency check on the file system of the container being based on a snapshot of the block device, wherein the performing of the consistency check on the file system of the container based on the snapshot of the block device comprises:
temporarily stopping I/O operations to the block device for the container;
synchronizing the file system metadata;
creating the snapshot of the block device having a state of the file system therein;
allowing the container to resume I/O operations;
exposing the created snapshot as a new block device;
creating a read-only mount of the file system from the new block device; and
performing read-only file system metadata consistency check;
when an inconsistency is detected on the block device metadata retrieved without stopping I/O operations to the block device for the container, temporarily stopping I/O operations to the block device for the container, retrieving block device metadata while the I/O operations to the block device for the container are temporarily stopped, allowing the I/O operations to the block device for the container to resume when the retrieval of the block device metadata is completed, performing consistency check on the block device metadata retrieved while the I/O operations to the block device for the container were temporarily stopped;
when no inconsistency is detected on the block device metadata retrieved without stopping I/O operations to the block device for the container or no inconsistency is detected on the block device metadata retrieved while the I/O operations to the block device for the container were temporarily stopped performing consistency check on the file system of the container based on a snapshot of the block device having a state of the file system therein.

18. The non-transitory computer readable medium of claim 17, wherein the instructions for the retrieving of the block device metadata without stopping I/O operations to the block device for the container and/or for the retrieving of the block device metadata while the I/O operations to the block device for the container are temporarily stopped comprise at least one of:

retrieving in-memory copy of the block device metadata via an interface to OS kernel;

retrieving at least a part of block device metadata from the container disk image; and sending a command to the OS kernel to synchronize changes made to in-memory copy of the block device metadata with the block device metadata stored in the container disk image.

19. The non-transitory computer readable medium of claim 17, wherein when an inconsistency is detected on the block device metadata retrieved while the I/O operations to the block device for the container were temporarily stopped or on the file system of the container taking one or more on-error actions.

20. The non-transitory computer readable medium of claim 17, wherein the performing of the consistency check on the block device metadata further comprises at least one of: checking for absences of blocks of data, and checking for duplicates of blocks of data.

* * * * *